United States Patent
Weisshappel et al.

[19]

[11] Patent Number: 5,857,148
[45] Date of Patent: Jan. 5, 1999

[54] PORTABLE ELECTRONIC DEVICE AND METHOD FOR COUPLING POWER THERETO

[75] Inventors: Robert N. Weisshappel, Barrington; James Robert Brunette, Wheeling; Scott David Beutler, Barrington; Stephen John Gaynes, Wonder Lake; James Dennis Domoleczny, Sr., Lindenhurst; Albert Leo Nagele, Wilmette; Gary Michael Cristiano, Hoffman Estates, all of Ill.

[73] Assignee: Motorola, Inc., Schaumburg, Ill.

[21] Appl. No.: 558,581

[22] Filed: Oct. 31, 1995

[51] Int. Cl.$^6$ .................................................. H04B 1/33
[52] U.S. Cl. .......................... 455/90; 455/572; 455/575; 455/351; 379/428; 429/9; 429/97; 429/123
[58] Field of Search ................................. 455/89, 90, 95, 455/127, 128, 344, 347, 348, 349, 351, 550, 572, 573, 574, 575, 38.1, 38.4; 429/9, 97, 99, 123; 379/423, 428, 434; 320/2

[56] References Cited

U.S. PATENT DOCUMENTS

| | | |
|---|---|---|
| D. 321,347 | 11/1991 | Colida . |
| D. 321,349 | 11/1991 | Colida . |
| D. 345,158 | 3/1994 | Namba et al. . |
| D. 345,356 | 3/1994 | Ando et al. . |
| D. 346,164 | 4/1994 | Shirakawa et al. . |
| D. 352,503 | 11/1994 | Nagele . |
| D. 356,560 | 3/1995 | Kornfeld et al. . |
| D. 359,734 | 6/1995 | Nagele et al. . |
| D. 361,065 | 8/1995 | Kornfeld et al. . |
| D. 369,598 | 5/1996 | Nagele et al. . |
| 4,018,998 | 4/1977 | Wegner . |
| 4,904,549 | 2/1990 | Goodwin et al. . |
| 5,027,394 | 6/1991 | Ono et al. . |
| 5,225,760 | 7/1993 | Leiserson . |
| 5,251,329 | 10/1993 | Takagi et al. ............................. 455/90 |
| 5,256,955 | 10/1993 | Tomura et al. . |
| 5,260,998 | 11/1993 | Takagi . |
| 5,307,511 | 4/1994 | Takahashi ................................ 455/351 |
| 5,308,716 | 5/1994 | Shababy et al. ......................... 429/123 |
| 5,335,368 | 8/1994 | Tamura . |
| 5,369,788 | 11/1994 | Nagai . |
| 5,436,625 | 7/1995 | Kubo . |
| 5,457,376 | 10/1995 | Chong et al. ............................ 455/572 |
| 5,525,888 | 6/1996 | Toya . |
| 5,548,824 | 8/1996 | Inubushi et al. ........................ 455/575 |
| 5,564,078 | 10/1996 | Nagai . |
| 5,604,050 | 2/1997 | Brunette et al. ......................... 429/97 |
| 5,697,070 | 12/1997 | Liebler ..................................... 455/575 |

FOREIGN PATENT DOCUMENTS

| | | |
|---|---|---|
| 0392857A2 | 10/1990 | European Pat. Off. . |
| 0617536A1 | 3/1994 | European Pat. Off. . |
| 0607041A2 | 7/1994 | European Pat. Off. . |
| 0608899A2 | 8/1994 | European Pat. Off. . |
| 612420 | 11/1983 | Japan . |
| 754981 | 2/1989 | Japan . |
| 2-179990 (A) | 7/1990 | Japan ..................................... 429/99 |
| 2179990 | 7/1990 | Japan ..................................... 429/99 |
| 805597 | 1/1991 | Japan . |
| 848974 | 10/1992 | Japan . |
| 849173 | 10/1992 | Japan . |
| 5-38057 | 2/1993 | Japan . |
| 875026 | 8/1993 | Japan . |
| WO9114332 | 9/1991 | WIPO . |
| WO9210004 | 6/1992 | WIPO . |

OTHER PUBLICATIONS

U.S. application No. 08/442,047 Latella et al., filed May 16, 1995.

Search Report, Great Britian, Application No. GB 9611237.0.

NTT, Do Co Mo, *Digital,* 1994 (Japanese product brochure).

*Primary Examiner*—Doris H. To
*Attorney, Agent, or Firm*—Mark D. Patrick

[57] ABSTRACT

A novel portable electronic device comprising a first housing portion (106) having a first battery (135) integrally associated with said first housing portion and a second housing portion (104) having a second battery (102) operatively coupled to an external surface of the second housing portion. Also, a method for coupling power to a portable electronic device comprises steps of providing a recessed region in a first housing portion for receiving a first battery and operatively coupling a second battery to an external surface of a second housing portion.

11 Claims, 11 Drawing Sheets

PORTABLE ELECTRONIC DEVICE AND METHOD FOR COUPLING POWER THERETO

BACKGROUND OF THE INVENTION

1. Field of the Invention

The present invention relates generally to portable electronic devices and more specifically to a device and method for coupling power to a portable electronic device.

2. Description of the Related Art

Consumer demands have fueled technological advances in the area of portable electronics. Through aggressive development and manufacturing, the industry has accomplished increased miniaturization of electronic components resulting in the advent of extremely lightweight and dimensionally constrained portable electronic devices, such as laptop computers and cellular radiotelephones. The current market has become inundated with a variety of the portable electronic devices from which the consumer can choose to purchase. Oftentimes the main selling points of the portable electronic device include operational features and cosmetic appearance.

One such operational feature of the portable electronic device is its duration of continuous operation, i.e., its amount of "talk" time and "standby" time. Portable electronic devices are typically powered by a rechargeable battery pack—multiple rechargeable electrochemical cells disposed within a housing—that is manufactured to attach to the portable electronic device. Because of the relatively large weight and size of rechargeable battery packs, current portable electronic devices typically only provide for attachment of a single, main rechargeable battery pack. Therefore, such portable electronic devices are limited to continuous operation only during the period between recharges of the main rechargeable battery pack. Such limitations are undesirable to a user that requires a longer duration of continuous operation and does not wish to sacrifice portability by having to carry additional rechargeable battery packs. Therefore, it would be beneficial to have a portable electronic device with increased of continuous operation without hampering its portability.

To increase the duration of continuous operation, it is known to attach an auxiliary rechargeable battery pack to the portable electronic device to supplement the main rechargeable battery pack in powering the portable electronic device. Current latching mechanisms for attaching rechargeable battery packs include parallel channels formed in the rechargeable battery pack that interlock with corresponding parallel rails disposed on the portable electronic device; and protruding members extending from the rechargeable battery pack that mate with indentations disposed about a cavity formed in the housing of the portable electronic device when the rechargeable battery pack is inserted into the cavity. However, because the auxiliary rechargeable battery pack is optional and need not always be attached to the portable electronic device for the portable electronic device to operate, current latching mechanisms are unacceptable for attaching an auxiliary rechargeable battery pack due to their adverse cosmetic impact. Without attachment of the auxiliary battery pack, for example, both the parallel rails on the portable electronic device and the housing cavity on the portable electronic device would remain unoccupied and exposed.

Therefore, what is needed is an effective latching mechanism for attaching an optional accessory, such as a rechargeable battery pack, to a portable electronic device, such that the appearance of the portable electronic device is minimally affected when the optional accessory is not attached.

DETAILED DESCRIPTION OF THE PREFERRED EMBODIMENTS

A latching mechanism disposed on an optional accessory for attaching the optional accessory to a portable electronic device includes a support and a moveable latch that mate with a retaining device disposed on the portable electronic device. The support and moveable latch are disposed on opposite ends of the optional accessory. The retaining device includes receptacles and a notch disposed on opposite ends as well as different sides of the portable electronic device. The retaining device is sized and oriented to minimally impact the appearance of the portable electronic device when the optional accessory is not attached thereto. Attachment of the optional accessory to the portable electronic device is accomplished by engaging the moveable latch with the notch as well as contacting the support and the receptacles. The moveable latch exerts a force on the notch drawing the support into snug contact with the receptacles. The force is exerted in a plane parallel to a side of the optional accessory that extends between the ends thereof.

Figure 1:
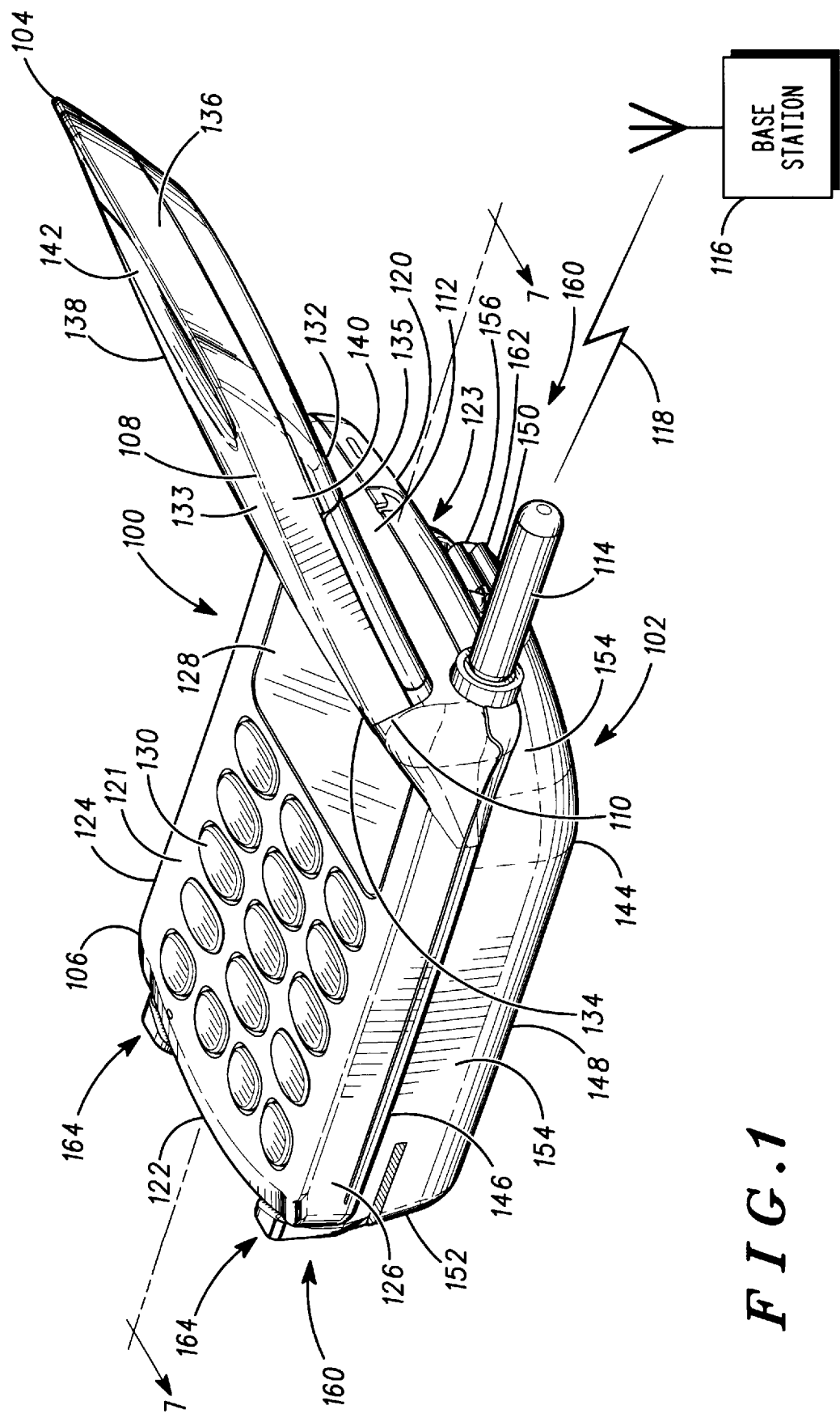
FIG. 1 illustrates a front and right side perspective view of a portable electronic device having an optional battery pack attached thereto.

FIG. 1 illustrates a front and right side perspective view of a portable electronic device having an optional battery pack attached thereto. A portable radiotelephone 100 and an optional battery pack 102 are shown attached in FIG. 1. The portable radiotelephone 100 includes a portable radiotelephone housing 104. The portable radiotelephone housing 104 is preferably molded from a suitable polymer material, such as polycarbonate. The portable radiotelephone housing 104 includes a lower housing portion 106 and an upper housing portion 108. The lower and upper housing portions 106, 108 are rotatably coupled via a hinge 110 disposed to extend planarly from a lower top end surface 112 of the lower housing portion 106. An antenna 114 extends perpendicularly from the lower top end surface 112. The antenna 114, which is coupled to a transceiver circuit 700 (see FIG. 7) disposed within the portable radiotelephone housing 104, permits the portable radiotelephone 100 to operate in a cellular radiotelephone environment by communicating with a fixed site cellular base station 116 via radio frequency waves 118.

The lower housing portion 106 includes a lower rear surface 120 and a lower front surface 121 extending downward from the lower top end surface 112 between a lower bottom end surface 122, a lower left surface 124, and a lower right surface 126. The lower rear surface 120 includes an optional battery pack retaining device 123 which will be further discussed in relation to FIGS. 2 and 3 below. The lower front surface 121 includes a display 128 disposed above a keypad 130. The display 128, which may be a liquid crystal display (LCD) or a light emitting diode (LED) type display, provides visual information to a user including, for example, the current amount of charge remaining in the optional battery pack 102. The keypad 130 allows the user to power the portable radiotelephone 100 on and off and initiate calls by inputting and sending numbers.

The upper housing portion 108 includes an upper rear surface 132 and an upper front surface 133 extending upward from the hinge 110 and between an upper bottom end surface 134, a sloped upper top end surface 136, an upper left surface 138, and an upper right surface 140. The upper rear surface 132 includes a main battery pack 135 which is removably attached thereto for providing power to the transceiver circuit 700 (see FIG. 7) of the portable radiotelephone 100. The main battery pack 135 and the portable radiotelephone housing 104 are manufactured so that the main battery pack 135 is flush with the upper rear surface 132 when attached. The upper front surface 133 includes a concave speaker bezel 142 having openings (see FIG. 3). Positioned behind the openings in the concave speaker bezel 142 and out of view is a speaker for providing audio communication to a user and from which a user may be audibly alerted that the main battery pack 135 or the optional battery pack 102 providing power to the portable radiotelephone 100 is nearing depletion.

The optional battery pack 102 includes an optional battery pack housing 144. The optional battery pack housing 144 is preferably molded from a suitable polymer material, such as polycarbonate. The optional battery pack housing 144 includes a front surface 146 and a rear surface 148 extending between a top end surface 150, a bottom end surface 152, a right side surface 154, and a left side surface 156. The optional battery pack 102 includes a latching mechanism 160 for attaching the optional battery pack 102 to the portable radiotelephone 100 so that the lower rear surface 120 of the portable radiotelephone housing 104 and the front surface 146 of the optional battery pack housing 144 are maintained in juxtaposition. The latching mechanism 160 includes a latch 162 extending outward from the top end surface 150 of the optional battery pack housing 144 and engaging the optional battery pack retaining device 123 of the portable radiotelephone housing 104. The latching mechanism 160 further includes a support 164 extending planarly from the bottom end surface 152 of the optional battery pack housing 144 and abutting the lower bottom end surface 122 of the portable radiotelephone housing 104.

Although the portable radiotelephone 100 is illustrated and described hereinbelow, it will be recognized that any one of a number portable electronic devices, such as lap top computers, camcorders, pagers, two way radios, personal digital assistants, and the like, could utilize the latching mechanism 160 and the method of latching described hereinbelow for attaching any accessory thereto, including a battery pack.

Figure 2:
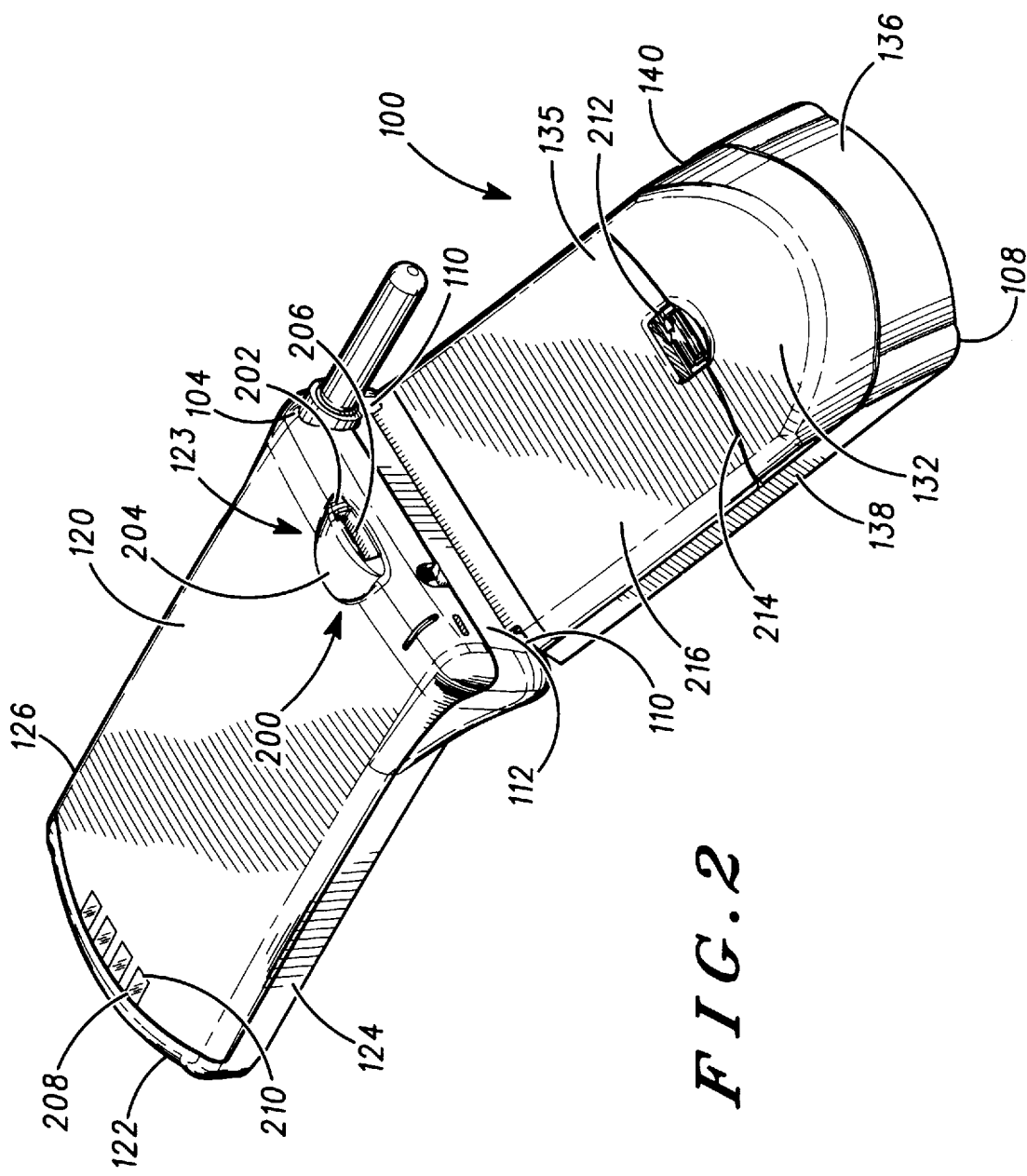
FIG. 2 illustrates a rear, left side, and top perspective view of the portable electronic device.

FIG. 2 illustrates a rear, left side, and top perspective view of the portable radiotelephone 100. The optional battery pack retaining device 123 is further shown in FIG. 2. The optional battery pack retaining device 123 includes a raised area 200 integrally formed with the lower rear surface 120 and located in proximity to the lower top end surface 112. The raised area 200 includes an elliptical face surface 202 extending outward from the lower rear surface 120 and a ramped portion 204 sloping back downward from the elliptical face surface 202 to the lower rear surface 120. The elliptical face surface 202 includes a notch 206 that faces in an upward direction but extends downward toward the lower bottom end surface 122. The notch 206 serves as a receptacle for the latch 162 of the latching mechanism 160. By providing the raised area 200, space within the portable radiotelephone housing 104 is conserved. Aside from the raised area 200, the lower rear surface 120 is devoid of any other latching receptacles that would detract from the appearance of the portable radiotelephone 100 when the optional battery pack 102 is not attached thereto.

Placing concerns about space savings aside, it will be recognized that the notch 206 could also be disposed in either the lower rear surface 120 or the lower top end surface 112 to extend within the portable radiotelephone housing 104 and towards the lower bottom end surface 122. Placed as such, the notch 206 would be equally capable of receiving the latch 162 of the latching mechanism 160 (see FIG. 1).

FIG. 2 also illustrates a set of flat contacts 208 disposed behind a series of openings 210 in the lower rear surface 120 in proximity to the lower bottom end surface 122. The set of flat contacts 208 are electrically connected to the transceiver circuit 700 (see FIG. 7) disposed within the portable radiotelephone housing 104. Upon attachment of the optional battery pack 102, the portable radiotelephone 100 is able to operate via power supplied to the set of flat contacts 208 by the optional battery pack 102. The set of flat contacts 208 are further discussed below in relation to FIG. 7.

Also shown in FIG. 2 is main battery 135 associated with upper housing portion 108. A latch member 212 at a distal end portion 214 of the main battery operatively mates with an associated latch member 216 of upper portion 108. Although outer surface 216 of main battery 135 forms a flush surface with upper rear surface 132, outer surface 216 of main battery 135 could extend above upper surface 132 to provide additional room for more or larger cells to provide greater capacity. The coupling of main battery 135 will be described in more detail in reference to FIGS. 10–14.

Figure 3:
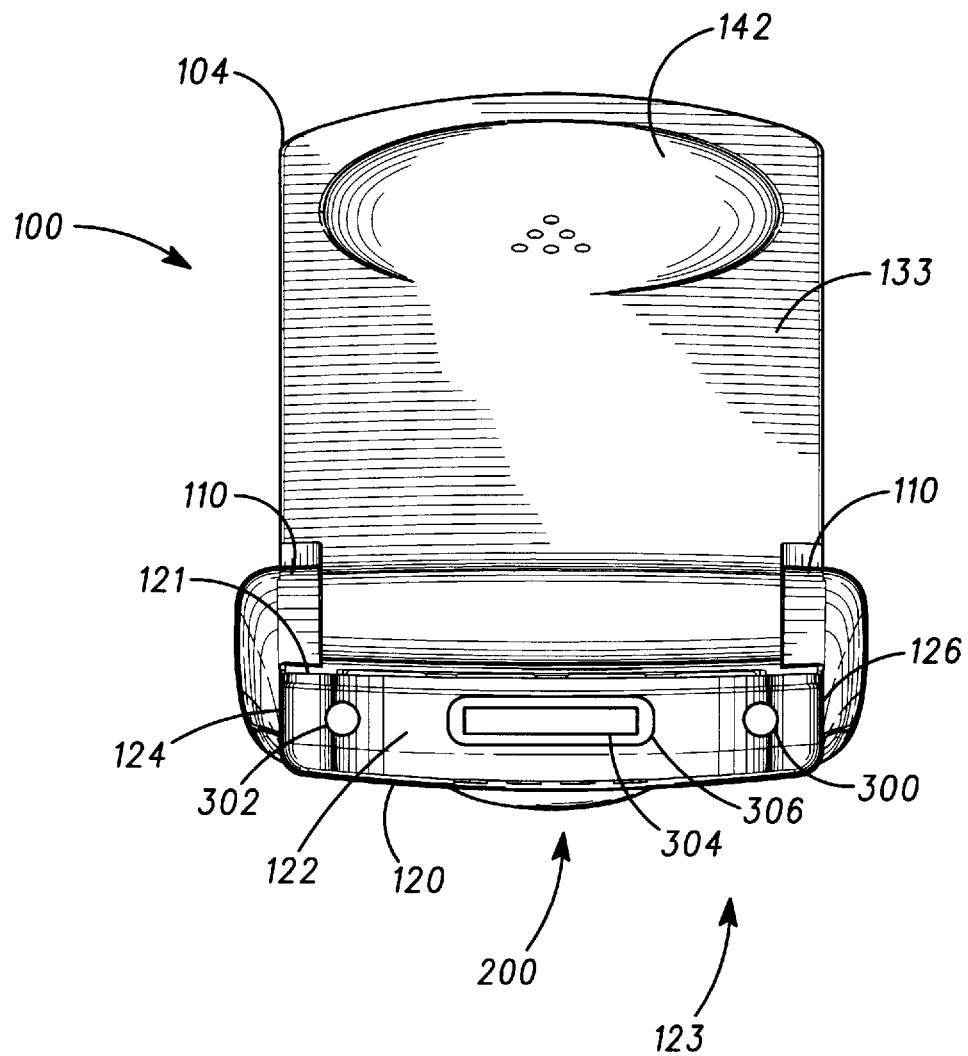
FIG. 3 illustrates a bottom plan view of the portable electronic device.

FIG. 3 illustrates a bottom plan view of the portable radiotelephone 100. The optional battery pack retaining device 123 is further shown in FIG. 3. The optional battery pack retaining device 123 includes a right receptacle 300 and a left receptacle 302 formed in the lower bottom end surface 122 in proximity to the lower right surface 126 and the lower left surface 124, respectively. The right and left receptacles 300, 302 extend into the lower housing portion 106 towards the lower top end surface 112 (see FIG. 7). By positioning the right and left receptacles 300, 302 on the lower bottom end surface 122 the appearance of the portable radiotelephone 100 is minimally impacted when the optional battery pack 102 is not attached. The right and left receptacles 300, 302 are of a diameter that is sized to permit insertion of a portion of the support 164 of the optional battery pack 102.

FIG. 3 also illustrates an external connector 304 disposed behind an opening 306 in the lower bottom end surface 122. The external connector 304 is connected to the transceiver board 700 (see FIG. 7) and allows the user to attach the portable radiotelephone 100 to an external power source, such as the battery of an automobile (not shown), for operating the portable radiotelephone 100 or charging the main battery pack 135. Such attachment can be accomplished by attaching a cigarette lighter adapter cable (not shown) between the external connector 304 and a cigarette lighter plug (not shown) of the automobile. The external connector 304 may also be used to couple the portable radiotelephone 100 to a hands free user interface (not shown) mounted in the automobile. The hands free user interface assists the user in many of the routine operations of the portable radiotelephone 100.

Figure 4:
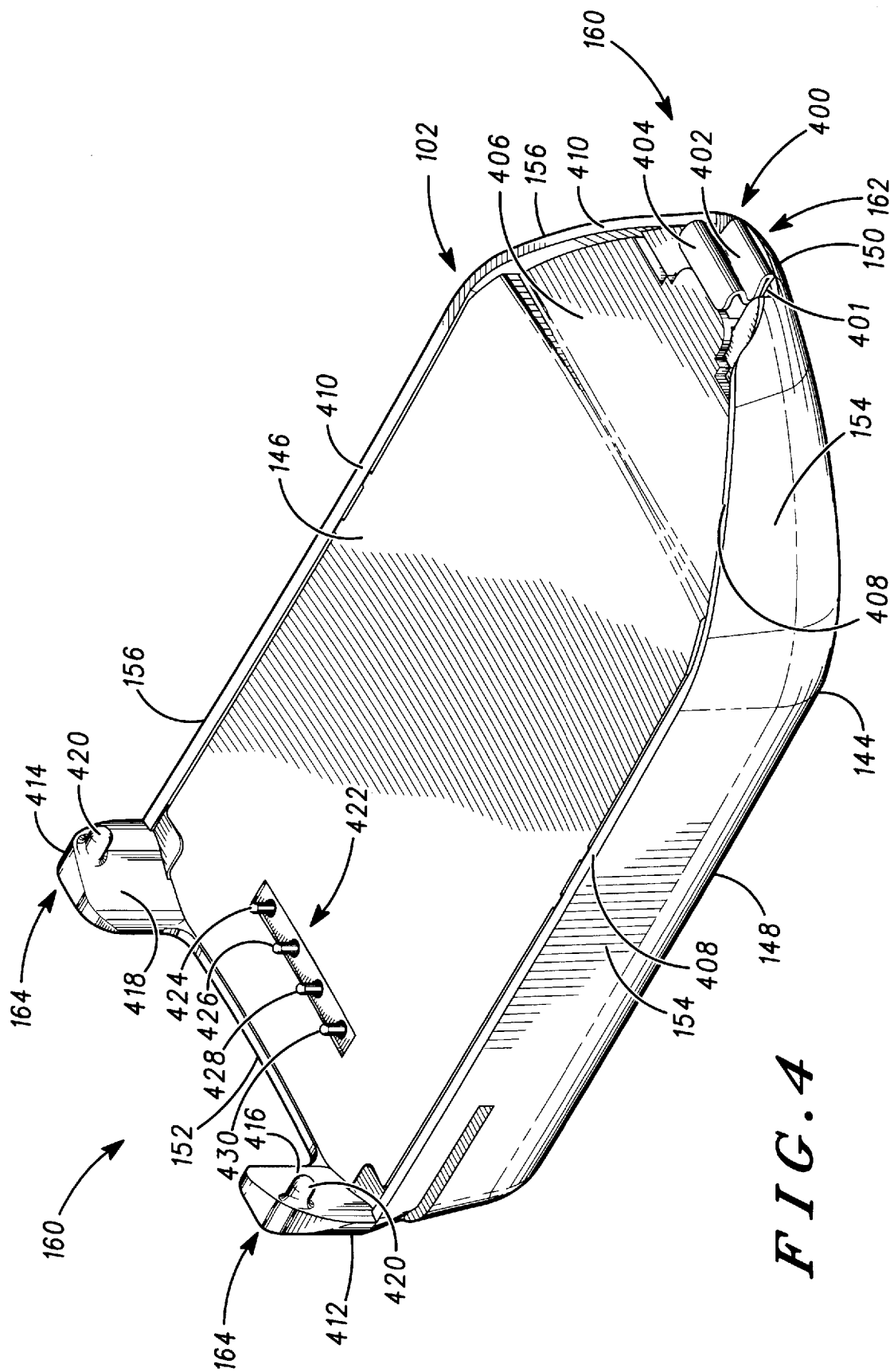
FIG. 4 illustrates a front, right side, and top perspective view of the optional battery pack employing a latching mechanism.

FIG. 4 illustrates a front, right side, and top perspective view of the optional battery pack 102. The latching mechanism 160 of the optional battery pack 102 is further shown in FIG. 4. The latch 162 of the latching mechanism 160 includes a catch 400 that extends upward through a top opening 401 in the top end surface 150. The catch 400 includes a receptacle 402 adjacent to a hooked end 404. The hooked end 404 extends toward the bottom end surface 152 and, in the preferred embodiment, is substantially parallel to the front surface 146 of the optional battery pack housing 144. The hooked end 404 is sized to engage the notch 206 of the raised area 200 of the optional battery pack retaining device 123 (see FIG. 2). To accommodate the raised area 200 of the portable radiotelephone 100, the optional battery pack housing 144 includes a recessed area 406 allowing edges 408 and 410 of the right and left side surfaces 154, 156, respectively, to perpendicularly abut the lower rear surface 120 of the portable radiotelephone 100 when the optional battery pack 102 is attached thereto, as shown in FIG. 1.

The support 164 of the latching mechanism 160 includes a right foot 412 and a left foot 414 extending planarly from the bottom end surface 152 and the respective edges 408, 410 of the right and left side surfaces 154, 156. The right and left feet 412, 414 are substantial mirror images of one another. The right and left feet 412, 414 include a right ramped top surface 416 and a left ramped top surface 418, respectively. The right and left ramped top surfaces 416, 418 slope downwards from the respective edges 408, 410 and are contoured to tightly abut the lower bottom end surface 122 of the portable radiotelephone 100 which is curved (see FIG. 2). The right and left feet 412, 414 are sized and oriented to allow access to, and prevent obstruction of, the external connector 304 (see FIG. 3) when the optional battery pack 102 is attached.

A cylindrical prong 420 extends upward from each of the right and left ramped top surfaces 416, 418. The cylindrical prong 420 extends perpendicular to the bottom end surface 152 of the optional battery pack housing 144 and parallel to the front surface 146 of the optional battery pack housing 144. During attachment of the optional battery pack 102 to the portable radiotelephone 100, the cylindrical prong 420 of each of the right and left ramped top surfaces 416, 418 inserts into the right and left receptacles 300, 302, respectively, as the right and left ramped top surfaces 416, 418 move into abutment with the lower bottom end surface 122 of the portable radiotelephone 100 (see FIGS. 2 and 3). The cylindrical prong 420 has a diameter that is sized slightly smaller than the right and left receptacles 300, 302 to ensure a snug fit therein.

Putting concerns of obstructing the external connector 304 aside, it will be recognized that the support 164 of the latching mechanism 160 could comprise a single foot (not shown) extending planarly from the bottom end surface 152 to abut all or a portion of the lower bottom end surface 122. The single foot could include either a single oblong cylindrical prong or multiple cylindrical prongs, each similar to cylindrical prong 420, that insert into a corresponding single oblong receptacle or corresponding multiple receptacles, each similar to the right and left receptacles 300, 302 disposed in the portable radiotelephone 100.

FIG. 4 further illustrates a set of projecting contacts 422 extending from the front surface 146 of the optional battery pack housing 144. The set of projecting contacts 422, as shown, consists of a positive contact 424, a thermistor sense contact 426, a data contact 428, and a negative or ground contact 430. Positive and negative polarities of a plurality of electrochemical cells 636 (see FIG. 6) disposed within the optional battery pack housing 144 are coupled to the respective positive and negative contacts 424, 430. A thermistor (not shown) disposed within the optional battery pack housing 144 is coupled between the negative polarity and the thermistor sense contact 426 for providing a resistance that may be used by a charger (not shown) to determine the temperature of the plurality of electrochemical cells 636 while the optional battery pack 102 is being charged. A resistive network or microprocessor (not shown) indicating the type of the plurality of electrochemical cells disposed within the optional battery pack housing 144 may be coupled to the data contact 428 to provide the identity of the plurality of electrochemical cells 636 to both the charger and the portable radiotelephone 100 for charging and discharging optimization. Upon attachment of the optional battery pack 102 to the portable radiotelephone 100, the contacts of the set of projecting contacts 422 of the battery pack 102 mate with respective contacts of the set of flat contacts 208 of the portable radiotelephone 100 (see FIG. 2).

Figure 5:
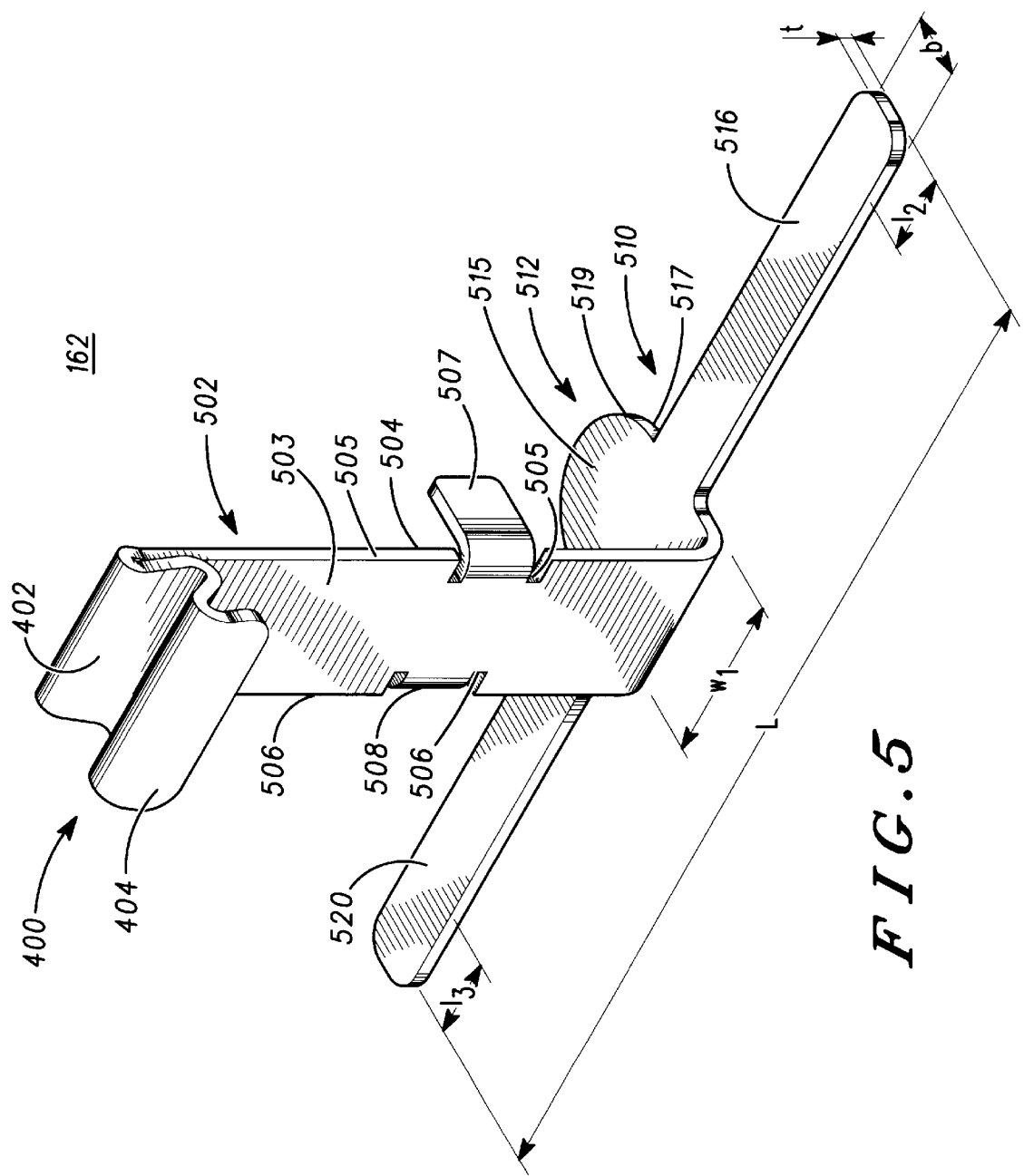
FIG. 5 illustrates a front, right side, and top perspective view of a latch of the latching mechanism.

FIG. 5 illustrates a front, right side, and top perspective view of the latch 162 of the latching mechanism 160. The latch 162 may be progressively stamped from beryllium copper alloy and heat treated, such as Brush Alloy 25 manufactured and sold by Brush Wellman Inc. Aside from the catch 400, the latch 162 includes an arm 502 and a crossbar 510. The arm 502 extends vertically between a midpoint of the crossbar 510 and the catch 400. The arm 502 includes a front surface 503 and a rear surface 504 with a right edge 505 and a left edge 506 extending therebetween. A first guide flange 507 and a second guide flange 508 extend outward and orthogonally rearward from opposing locations on the right and left edges 505, 506, respectively.

The crossbar 510 extends horizontally with respect to the arm 502. The midpoint of the crossbar 510 is defined by a central hub 512 that extends orthogonally rearward from an end of the arm 502 opposite the catch 400. The central hub 512 has a width that is equal to that of the arm 502. The central hub 512 includes a top surface 515 and a bottom surface 517 interconnected by a curved edge 519. A first finger 516 extends coplanarly rightward from the curved edge 519. A second finger 520, which is substantially a mirrored image of the first finger 516, extends coplanarly leftward from the curved edge 519 directly opposite to the first finger 516. The first and second fingers 516, 520 are of a width that is less than that of the central hub 512.

The crossbar 510 is dimensioned to allow the first and second fingers 516, 520 to flex in a plane perpendicular to the central hub 512. When ends of the crossbar 510 are supported or anchored, a perpendicular force applied to either the top or bottom surfaces 515, 517 of the central hub 512 causes the crossbar 510 to bow and the central hub 512 to deflect. Removal of the perpendicular force causes the crossbar 510 to straighten. The crossbar 510 operates as a spring that is biased towards the straightened position. Therefore, when the central hub 512 is deflected above the ends of the crossbar 510, the crossbar 510 exerts a downward force. This downward force is translated to the hooked end 404 of the catch 400 via the arm 502 and enables sufficient latching of the optional battery pack 102 to the portable radiotelephone 100.

To determine the downward force necessary to maintain the optional battery pack 102 in attachment to the portable radiotelephone 100, the following factors were considered: the weight of the optional battery pack 102; the spring force of the set of projecting contacts 422; the amount of surface area of the support 164; the length and quantity of the cylindrical prongs 420 of the support 164; the orientation of the cylindrical prongs 420 and the hooked end 404; and the depth and orientation of the notch 206 and the right and left receptacles 300, 302 of the optional battery pack retaining device 123. In view of the factors, a force of approximately 22 N was determined to be sufficient.

To calculate the dimensions of the crossbar 510 necessary to exert approximately 22 N of force while the optional battery pack 102 is attached to the portable radiotelephone 100, the crossbar 510 was modeled as a leaf spring. The leaf spring is governed by the following known equation (derived from *Machinery's Handbook* by Erik Oberg and F. D. Jones, 1970, Industrial Press Inc.):

$$L = \sqrt[3]{\frac{4Ebt^3\partial}{F}},$$

where

L is the length of the leaf spring,

E is the modulus of elasticity of the leaf spring, b is the width of the leaf spring, and t is the thickness of the leaf spring, $\partial$ is the defection at the center of the leaf spring, and F is force.

For clarity, the dimensions of the leaf spring recited hereinbelow are specified in FIG. 5.

In solving the equation, the following assumptions were made:

1. The length L of the leaf spring is reduced by width w1 of the central hub 512 (6 mm) which remains rigid during the bowing of the crossbar 510 and by lengths l2 and l3 of the crossbar 510 (2 mm and 2 mm) which are supported or anchored during the bowing of the crossbar 510.

2. The modulus of elasticity (E) is approximately 1.32E5 N/mm² for beryllium-copper alloy having a thickness (t) of 0.5 mm.

3. The width of the leaf spring (b) is 2.75 mm.

4. The deflection at the center of the leaf spring ($\partial$) is 3 mm when the latch 162 is extended to the engaged position 648 (see FIG. 6).

5. The force (F) is 22 N.

These assumptions result in the following:

$$L - (6mm + 2mm + 2mm) = \sqrt[3]{\frac{4(1.32E5N/mm^2)(2.75mm)(0.5mm)^3(3mm)}{22N}}$$

$$L = 29.14mm + 10mm = 39.14mm.$$

Figure 6:
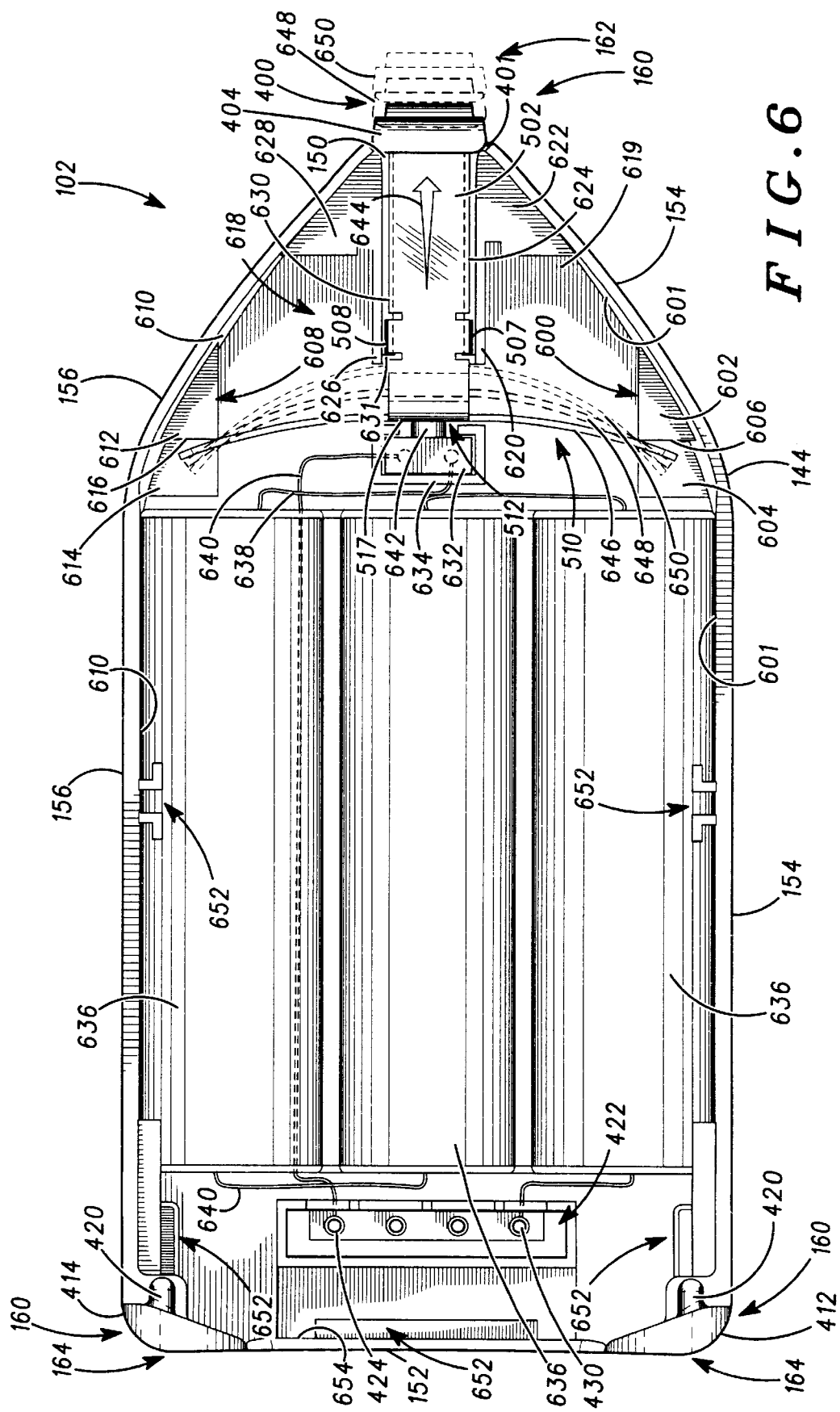
FIG. 6 illustrates a front elevational view of the optional battery pack having a front surface removed and multiple positions of the latch.

FIG. 6 illustrates a front elevational view of the optional battery pack 102 having a front surface 146 removed and multiple positions of the latch 162. The optional battery pack housing 144 is molded to engage the latch 162. The optional battery pack housing 144 includes a first anchor 600 disposed on a right side inner surface 601 thereof. The first anchor 600 is formed by a right triangular front ledge 602 and a right triangular rear ledge 604 offset and interconnected by a right wall 606. A second anchor 608, which is substantially a mirrored image of the first anchor 600, is disposed on a left side inner surface 610 directly opposite the first anchor 600. The second anchor 608 is formed by a left triangular front ledge 612 and a left triangular rear ledge 614 offset and interconnected by a left wall 616.

The optional battery pack housing 144 includes a track 618 that extends downward from the top opening 401 in the top end surface 150 in a direction that is coplanar with the front surface 146 (when attached). The track 618 further extends perpendicularly rearward with respect to the front surface 146 to a rear inner surface 619 of the rear surface 148. Right and left parallel edges of the track 618 are defined by a right rail 620 and a left rail 626, respectively. The right and left rails 620, 626 extend orthogonally frontward from the track 618. A right shelf 622 extends between an upper portion of the right rail 620 and the right side inner surface 601. A left shelf 628, opposite the right shelf 622, extends between an upper portion of the left rail 626 and the left side inner surface 610. A right trough 624 and a left trough 630 adjoining and extending along the right and left rails 620 and 626, respectively, are disposed in the track 618. The right and left troughs 624, 630 extend between the top opening 401 and a stop 631, which is disposed on an end of the track 618 opposite the top opening 401. The stop 631, which is flush with the track 618, extends perpendicularly rearward therefrom to the rear inner surface 619.

The optional battery pack 102 includes a switch 632 for preventing the optional battery pack 102 from providing power when it is not attached to the portable radiotelephone 100. The switch 632 is positioned at a predetermined distance beneath the stop 631. The switch 632 is held in a U-shaped channel 634 that extends frontward from the rear inner surface 619. The switch 632 is electrically coupled between a first wire 638 carrying a positive polarity of the plurality of electrochemical cells 636 and a second wire 640 coupled to the positive contact 424 of the set of projecting contacts 422. The switch 632 includes a button 642 extending from a top surface thereof. When the button 642 is depressed, the switch 632 is placed in an opened state wherein the first wire 638 and the second wire 640 are electrically disconnected such that the positive polarity of a plurality of electrochemical cells 636 is not delivered to the positive contact 424. When the button 642 is not depressed, the switch 632 is placed in a closed state wherein the first wire 638 and the second wire 640 are electrically connected such that the positive polarity of a plurality of electrochemical cells 636 is delivered to the positive contact 424.

Although the switch 632 is disclosed as an electromechanical switch, it will be recognized that switching could be accomplished by a microprocessor circuit (not shown) disposed within the optional battery pack 102. The microprocessor circuit detects attachment of the optional battery pack 102 to the portable radiotelephone 100 via, for example, an optical sensor (not shown) or a magnetic reedswitch (not shown) coupled thereto and connects or disconnects the plurality of electrochemical cells 636 accordingly.

The latch 162 is assembled into the optional battery pack housing 144 as follows. The latch 162 is first positioned such that the arm 502 is generally juxtaposed with the track 618 between the right and left rails 620, 626. Also, the ends of the crossbar 510 rest on the right and left triangular rear ledges 604, 614 and curved edge 519 of the central hub 512 contacts the side of the button 642 of the switch 632. The latch 162 is then rotated about the crossbar 510 causing the catch 400 to move frontward (out of the page) while a force in a direction of arrow 644 is applied on the central hub 512 until the first and second guide flanges 507, 508 clear the stop 631 and curved edge 519 clears the button 642. During the rotation and application of the force, the crossbar 510 bows about the central hub 512 causing the ends thereof to tightly abut the right and left walls 606, 616, respectively, and causing the central hub 512 to be vertically deflected. Assembly of the latch 162 into the optional battery pack housing 144 is completed when the bottom surface 517 of the central hub 512 depresses the button 642 of the switch 632 and the first and second guide flanges 507, 508 inserts into the right and left troughs 624, 630, respectively, and rest against a top surface of the stop 631.

The latch 162 is further maintained in assemblage by the front surface 146 (see FIG. 4) of the optional battery pack housing 144. The optional battery pack housing 144 includes mounts 652 extending from the inner right side surface 601, the inner left side surface 610, and an inner bottom surface 654 of the bottom end surface 152. The mounts 652 mate with snaps (not shown) positioned about a periphery of an underside of the front surface 146. To assemble the front surface 146 to the optional battery pack housing 144, the front surface 146 is positioned such that a central groove (not shown) formed on the underside of the front surface 146 beneath the recessed area 406 engages the right and left rails 620, 626. The front surface 146 is then angled slightly and slid such that a right flap and a left flap (not shown), which are formed to extend upward from the underside of the recessed area 406 on either side of the groove, are drawn under the right and left shelves 622, 628, respectively, of the optional battery pack housing 144. The front surface 146 is then angled back rearwardly until the snaps on the underside of the front surface 146 mate with the mounts 652. Once the front surface 146 is attached, the arm 502 is maintained in juxtaposition with the track 618 and the first and second guide flanges 507, 508 are maintained in the right and left troughs 624, 630, respectively. The latch 162 is restricted to movement in a plane that is parallel to the front surface 146 and perpendicular to the top end surface 150.

Once assembled, the latch 162 resides in a rest position 646 that is defined by a slight deflection of the central hub 512 above the ends of the crossbar 510 as shown in FIG. 6. In the rest position 646, the optional battery pack 102 is unattached from the portable radiotelephone 100. The first and second guide flanges 507, 508 abut the top surface of the stop 631. The button 642 of the switch 632 is depressed by the bottom surface 517 of the central hub 512 disconnecting the plurality of electrochemical cells 636 from the set of projecting contacts 422. By disconnecting the plurality of electrochemical cells 636 when the optional battery pack 102 is unattached, discharging and adverse heating of the optional battery pack 102 is prevented should the set of projecting contacts 422 come into contact with a foreign conductive object while the optional battery pack 102 is being carried on the user.

When attaching the optional battery pack 102 to the portable radiotelephone 100, the latch 162 is first extended from the rest position 646 to an engaging/disengaging position 650 and then released to an engaged position 648, both of which are shown in dotted line in FIG. 6. The range of extension of the latch 162 is defined by deflection of the central hub 512 between the rest position 646 and a bottom surface of the stop 631. Any extension of the latch 162 from the rest position 646 causes the first and second guide flanges 507, 508 to move upward in the right and left troughs 624, 630, respectively, away from the stop 631; the ends of the crossbar 510 to pivot about the right and left walls 606, 616; and the central hub 512 to further deflect and release the button 642 of the switch 632. Once the button 642 is released as shown in dotted line in FIG. 6, the plurality of electrochemical cells 636 are connected to the set of projecting contacts 422 and power may be provided therefrom.

The engaging/disengaging position 650 describes the position of the latch 162 and the amount of deflection of the central hub 512 when the optional battery pack 102 is being attached to, or detached from, the portable radiotelephone 100. In the engaging/disengaging position 650, the latch 162 is extended beyond the engaged position 648 to, among other things, permit alignment of the cylindrical prong 420 of the right and left feet 412, 414 of the support 164 of the optional battery pack 102 beneath the respective right and left receptacles 300, 302 of the optional battery pack retaining device 123 of the portable radiotelephone 100.

Figure 7:
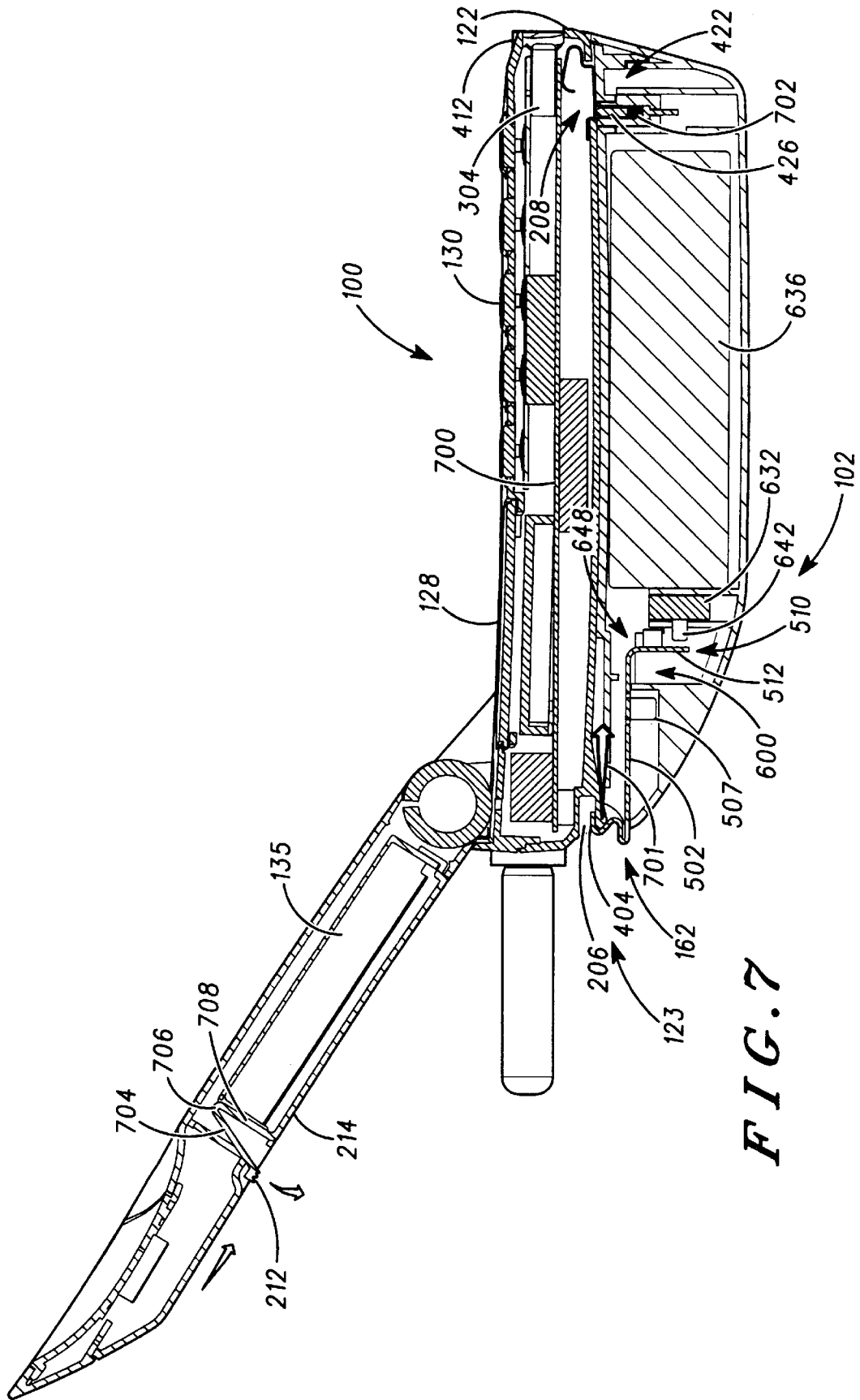
FIG. 7 llustrates a cross-sectional view of the portable electronic device and attached optional battery pack taken along section lines 1—1 of FIG. 1.

FIG. 7 illustrates a cross-sectional view of the portable radiotelephone 100 and attached optional battery pack 102 taken along section lines 1—1 of FIG. 1. The engaged position 648 describes the position of the latch 162 and the amount of deflection of the central hub 512 of the crossbar 510 when the optional battery pack 102 is attached to the portable radiotelephone 100. In the engaged position 648, the hooked end 404 of the latch 162 engages the notch 206 of the optional battery pack retaining device 123 with a force 701 (approximately 22 N), to maintain the optional battery pack 102 in attachment with the portable radiotelephone 100. The force 701 imparted by the hooked end 404 on the notch 206 and the surrounding elliptical face surface 202 effectively pushes both the right and left receptacles 300, 302 (see FIG. 3) around the cylindrical prongs 420 of the right and left feet 412, 414 of the support 164 (see FIG. 4) and the lower bottom end surface 122 of the portable radiotelephone 100 into snug abutment with the right and left ramped top surfaces 416, 418 of the right and left feet 412, 414 of the support 164.

When in the engaged position 648, the set of projecting contacts 422 of the optional battery pack 102 are in electrical contact with the set of flat contacts 208 of the portable radiotelephone 100. Each of the set of projecting contacts 422 are spring loaded to depress from a fully extended position (see FIG. 4) upon contact with the set of flat contacts 208 so as to minimize the force required to maintain the optional battery pack 102 in attachment with the portable radiotelephone 100. The operation of all of the contacts of the set of projecting contacts 422 is exemplified in FIG. 7, which shows the thermistor sense contact 426 in a depressed position. A spring 702 is disposed beneath the thermistor sense contact 426 to permit easy depression thereof upon contact with a corresponding contact of the set of flat contacts 208. The spring 702 biases the thermistor sense contact 426 towards the fully extended position such that when depressed, the thermistor sense contact 426 is still maintained in electrical contact with the corresponding contact of the set of flat contacts 208.

Once attached, the plurality of electrochemical cells 636 of the optional battery pack 102 preempt the main battery pack 135 and the optional battery pack 102 powers the portable radiotelephone 100. This is accomplished by a fast switch (not shown) that is coupled between the main and optional battery packs 135, 102 and the transceiver board 700 and is controlled by the transceiver board 700. Therefore, when both the main and optional battery packs 135, 102 are coupled to the transceiver board 700, the portable radiotelephone 100 operates from the optional battery pack 102. Prior to complete discharge and/or removal of the optional battery pack 102, the fast switch automatically switches from the optional battery pack 102 to the main battery 135 without interrupting the operation of the portable radiotelephone 100. Once removed, the optional battery pack 102 may be recharged while the portable radiotelephone 100 operates via power provided by the main battery pack 135. Once recharged, the optional battery pack 102 can be reattached and switched to power the portable radiotelephone 100. While attached to the portable radiotelephone 100, the main and optional battery packs 135, 102 may be charged by attaching a charger to the external connector 304 of the portable radiotelephone 100. When charged in this manner, the transceiver board 700 charges the main battery pack 135 to completion prior to switching and charging the optional battery pack 102. Main battery pack 135 may also be removed by applying pressure to a lever arm 704 which is coupled by a fulcrum 706 to a fixed portion 708 of the main battery. The battery is tilted downward as shown and removed.

Figure 8:
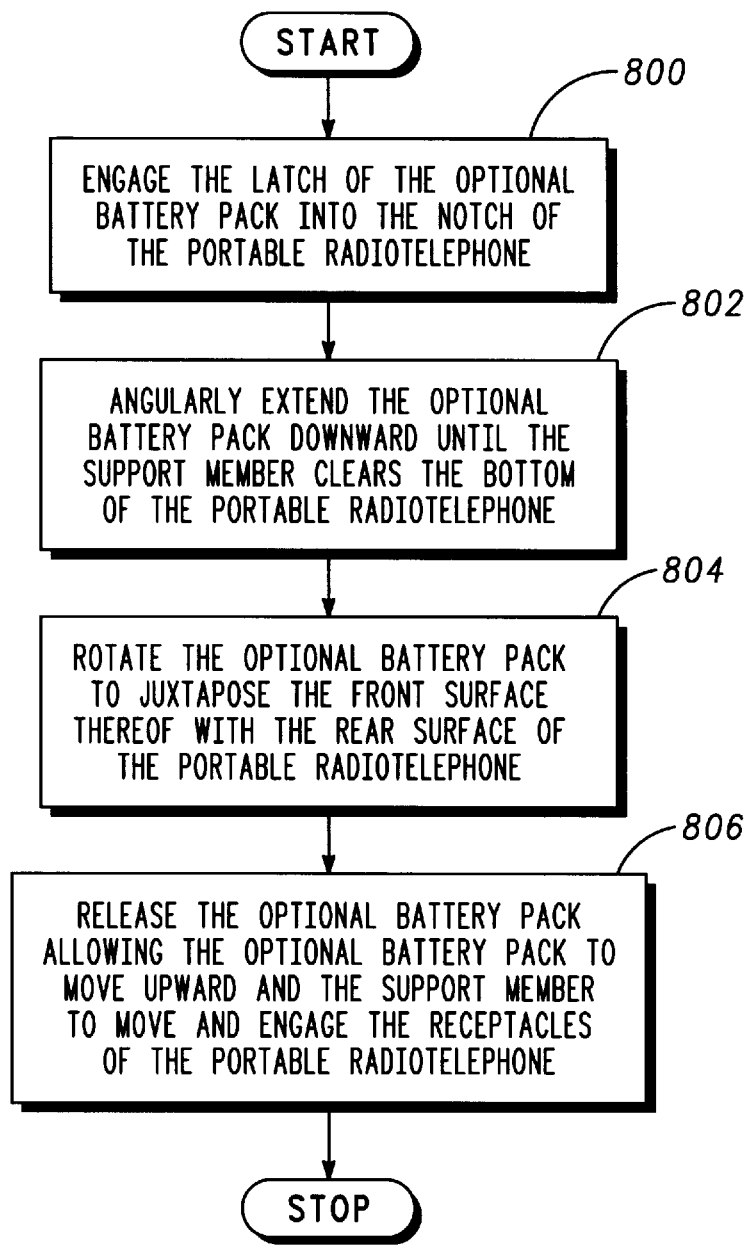
FIG. 8 illustrates a flow chart of a method of latching the optional battery pack to the portable electronic device.

FIG. 8 illustrates a flow chart of a method of latching the optional battery pack 102 to the portable radiotelephone 100. Initially, the hooked end 404 of the latch 162 of the latching mechanism 160 (see FIG. 3) is inserted into the notch 206 of the optional battery pack retaining device 123 (see FIG. 2), at step 800.

The optional battery pack 102 is then pulled downward at an angle until the cylindrical prongs 420 of the right and left feet 412, 414 of the support 164 of the latching mechanism 160 (see FIG. 4) clear the lower bottom end surface 122 of the portable radiotelephone 100 (see FIG. 2), at step 802. As the optional battery pack 102 is pulled downward, the latch 162 is extended from the rest position 646 releasing the button 642 of the switch 632 (see FIG. 6). Once released, the plurality of electrochemical cells 636 are coupled to the set of projecting contacts 422. The optional battery pack 102 is pulled downward until the latch 162 is in the engaging/disengaging position 650.

At step 804, the optional battery pack 102 is maintained in the engaging/disengaging position and rotated about the hooked end 404 and angled back until the front surface 146 of the optional battery pack 102 (FIG. 4) is in juxtaposition with the rear surface 120 of the portable radiotelephone 100 (FIG. 2). Once juxtaposed, the set of projecting contacts 422 of the optional battery pack 102 depress and electrically contact a lower portion of the set of flat contacts 208 of the portable radiotelephone 100. With the switch 632 already released, the plurality of electrochemical cells 636 provide power to the portable radiotelephone 100 via the electrical connection of the set of projecting contacts 422 and the set of flat contacts 208. The cylindrical prongs 420 of the latching mechanism 160 are aligned directly beneath the corresponding right and left receptacles 300, 302 (see FIG. 3) of the optional battery pack retaining device 123 of the portable radiotelephone 100.

Attachment of the optional battery pack 102 to the portable radiotelephone 100 becomes complete with the execution of step 806, which denotes releasal of the optional battery pack 102 so as to allow the optional battery pack 102 to move upward and cause the cylindrical prongs 420 to insert into the right and left receptacles 300, 302 and the right and left ramped top surfaces 416, 418 (see FIG. 4) to abut the lower bottom end surface 122 of the portable radiotelephone 100. With releasal, the set of projecting contacts 422 remain depressed and in electrical contact with the set of flat contacts 208 as they move to reside in an upper portion of the set of flat contacts 208 (see FIG. 7). Once attached, the latch 162 resides in the engaged position 648 (see FIGS. 6 and 7).

Detachment of the optional battery pack 102 from the portable radiotelephone 100 is illustrated by substantially reversing the order of the aforementioned steps 800–806. To accomplish detachment, the optional battery pack 102 is first pulled downward until the cylindrical prongs 420 are completely removed from the right and left receptacles 300, 302 and the latch 162 moves from the engaged position 648 to the engaging/disengaging position 650; the optional battery pack 102, while maintained in the engaging/disengaging position 650, is next rotated about the hooked end 404 so as to remove the front surface 146 from its juxtaposition with the rear surface 120 of the portable radiotelephone 100 and remove the set of projecting contacts 422 from electrical contact with the set of flat contacts 208; and, finally, the optional battery pack 102 is released thereby permitting removal of the hooked end 404 from the notch 206 and retraction of the latch 162 from the engaging/disengaging position 650 to the rest position 646. Once retracted to the rest position 646, the button 642 of the switch 632 is once again depressed thereby causing the plurality of electrochemical cells 636 to become disconnected from the set of projecting contacts 422.

Figure 9:
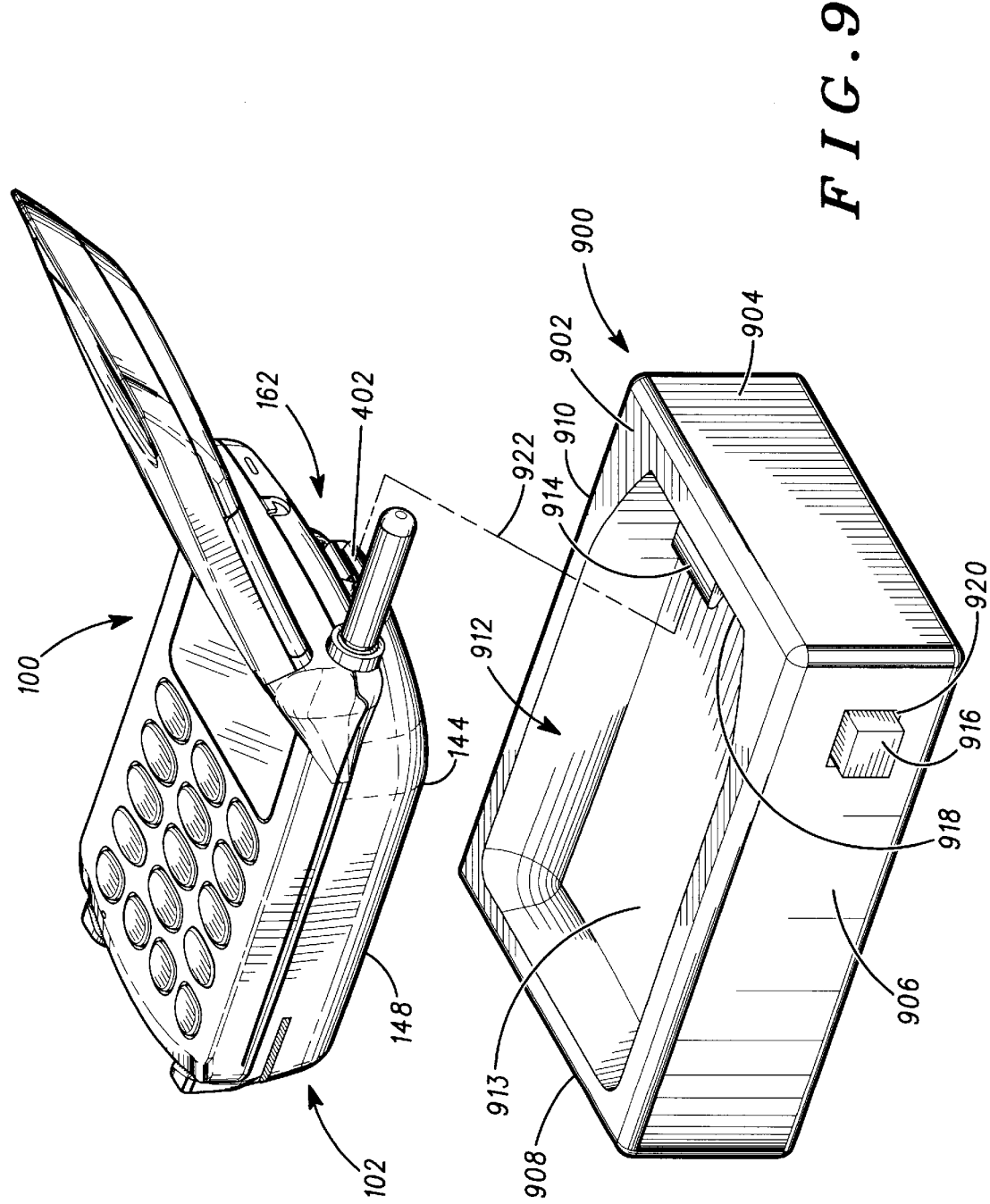
FIG. 9 illustrates the portable electronic device having an optional battery pack attached thereto and an associated accessory.

FIG. 9 illustrates the portable radiotelephone 100 having the optional battery pack 102 attached thereto and an associated accessory. Aside from latching the optional battery pack 102 to the portable radiotelephone 100, the latch 162 includes the receptacle 402 (see FIG. 4) to allow attachment of the portable radiotelephone 100 into an accessory, such as a hang-up cup, while the optional battery pack 102 is attached to the portable radiotelephone 100. In FIG. 9, the portable radiotelephone 100 with the optional battery pack 102 attached thereto is positioned above a hang-up cup 900. The hang-up cup 900 includes a front surface 902 having a top side 904, a right side 906, a bottom side 908, and a left side 910 extending rearward therefrom. The front surface 902 includes a recess 912 that is sized in accordance with the optional battery pack housing 144. The recess 912 includes a bottom surface 913 defining the depth thereof. A latch member 914 extends into the recess 912 from a top sidewall 918 of the recess 912 that extends opposite the top side 904 between the front surface 902 and the recessed surface 913. A button 916 that is depressible is biased to extend from a right opening 918 in the right side 906 of the hang-up cup 900. Upon depression of the button 916 into the right opening 920, the latch member 914 retracts into the top sidewall 918 from a latching position shown in FIG. 9. The hang-up cup 900 is typically mounted within the passenger compartment of a vehicle (not shown) and in close proximity to the operator of the vehicle to temporarily hold the portable radiotelephone 100 while it is not being used by the operator.

The portable radiotelephone 100 with the optional battery pack 102 attached thereto is attached to the hang-up cup 900 by juxtaposing the rear surface 148 of the optional battery pack housing 144 and the recessed surface 913 of the hang-up cup 900 while depressing the button 916 and retracting the latch member 914. When the portable radiotelephone 100 with the optional battery pack 102 attached thereto is positioned in the recess 912, the button 916 is released causing the latch member 914 to engage the receptacle 402 of the latch 162 as telegraphed by dotted line 922. The portable radiotelephone 100 with the optional battery pack 102 attached thereto remains securely attached to the hang-up cup 900 until the user depresses the button 916 to retract the latch member 914 and lift the portable radiotelephone 100 with the optional battery pack 102 attached thereto away from the recess 912.

Figure 10:
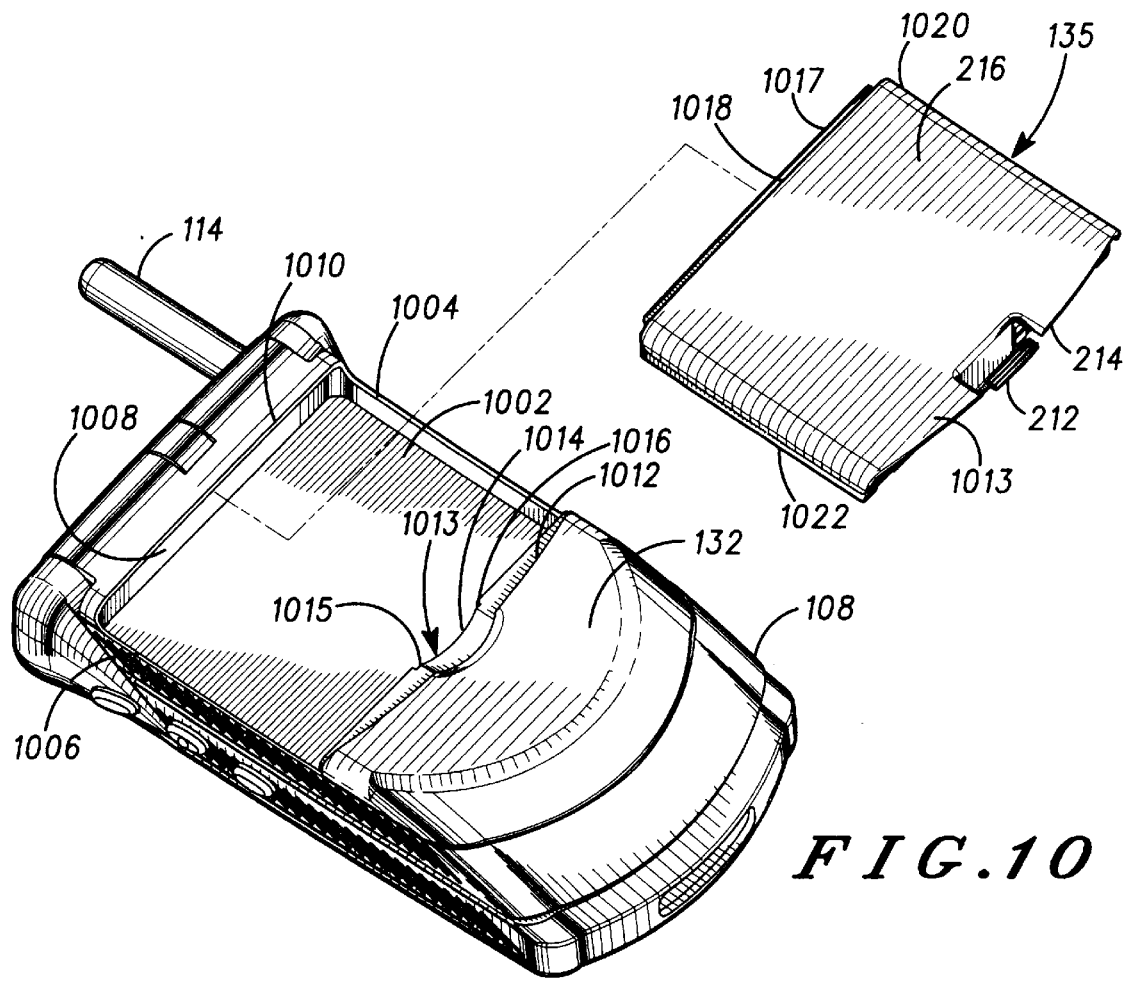
FIG. 10 illustrates the portable electronic device in a closed position with a main battery pack detached showing the inside and rear wall of a recessed region for receiving the main battery pack.

Turning now to FIGS. 10–14, the coupling of main battery pack 135 to the portable electronic device is shown. As shown in FIG. 10, the portable electronic device is in a closed position with main battery pack 135 detached. A recessed region 1002 for receiving the main battery pack comprises a first side wall 1004 and a second side wall 1006, and a rear wall 1008. A flange 1010 extends outward from the rear wall and over the recessed area. A second recessed area 1012 of upper rear surface 132 provides a flat surface for supporting an associated flange 1013 of main battery 135. A mating latch member 1013 comprises a recessed area 1014 having shoulders 1015 and 1016 adapted to receive latch member 212 to removably attach the main battery to the portable electronic device. When main battery 135 is inserted into recess 1002, a protrusion 1017 at a distal end 1018 of main battery 135 is adapted to be inserted below flange 1010.

Figure 11:
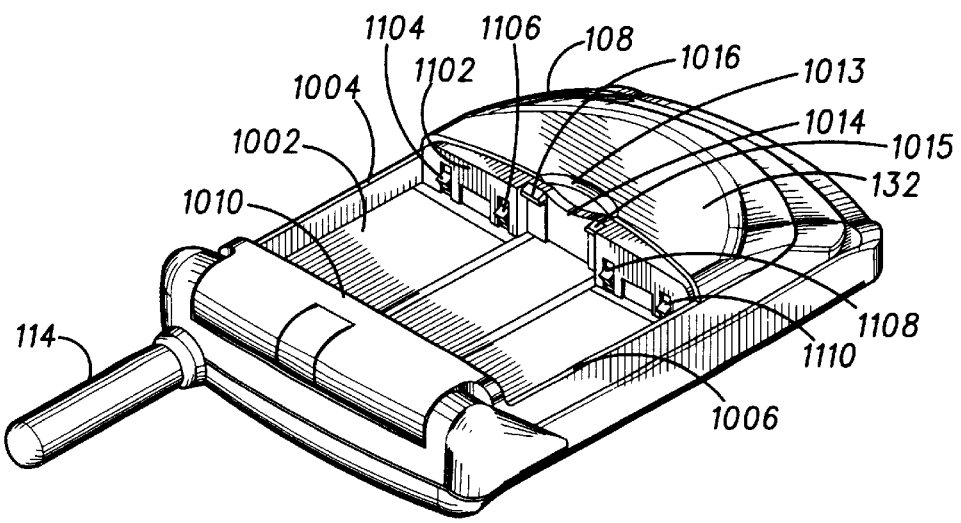
FIG. 11 illustrates the portable electronic device in a closed position with a main battery pack detached showing the inside and front wall of the recessed region.
Figure 12:
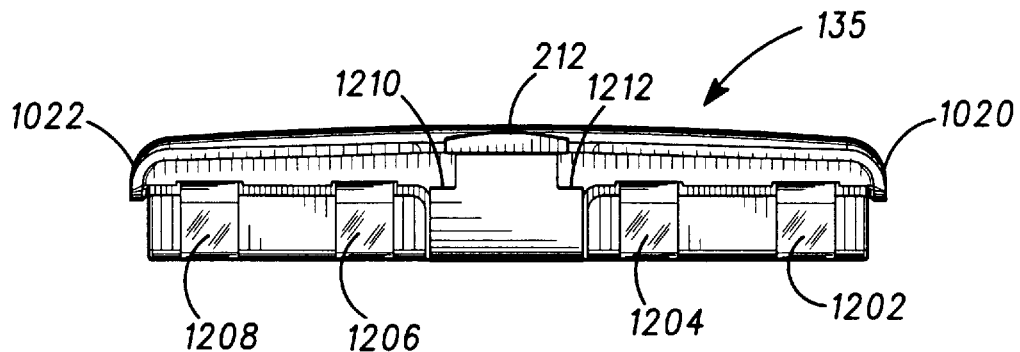
FIG. 12 illustrates a front elevational view of the main battery detached from the portable electronic device.
Figure 13:
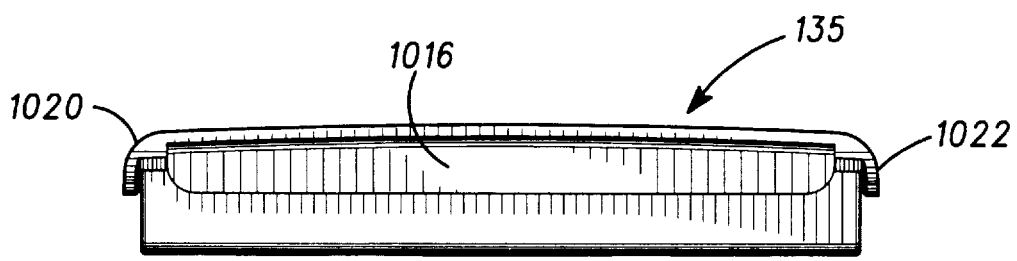
FIG. 13 illustrates a rear elevational view of the main battery detached from the portable electronic device.
Figure 14:
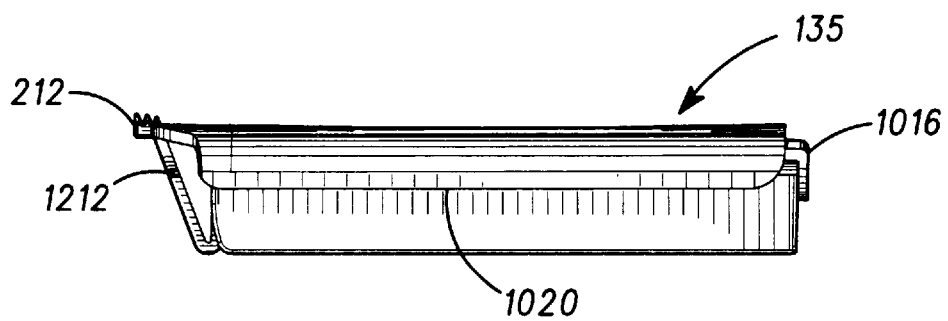
FIG. 14 illustrates a side elevational view of the main battery detached from the portable electronic device.

As shown in FIG. 11, the inside and front walls of a recessed region for receiving the main battery pack includes contacts 1104–1110 which are adapted to mate with contacts 1202–1208 on the front surface of main battery pack 135 (FIG. 12). When main battery pack 135 is inserted into recess 1002, shoulders 1210 and 1212 are adapted to be inserted under shoulders 1015 and 1016. Edges 1020 and 1022 form a flush surface with side walls 1004 and 1006 respectively.

In summary, a latching mechanism disposed on an optional accessory, such as an optional battery pack, for attaching the optional battery pack to a portable electronic device, such as a portable radiotelephone, includes a support and a moveable latch that mate with first and second portions of a retaining device disposed on opposite ends of the portable radiotelephone. Because the retaining device is for an optional battery pack to supplement a main battery attached elsewhere on the portable radiotelephone, the retaining device should only minimally affect the appearance when the optional battery pack is not attached. The support includes a foot having a prong that is disposed on a first end of the optional battery pack and faces a hooked end of the moveable latch disposed on a second end of the optional battery pack. The moveable latch includes a spring disposed within the optional battery pack and coupled to the hooked end such that when the moveable latch is extended, the hooked end exerts a force on the first portion of the retaining device that draws the support into snug abutment with the second portion of the retaining device. The force, which is in a plane parallel to a front surface of the optional battery pack that extends between the ends thereof, maintains the optional battery pack in attachment with the portable radiotelephone allowing the optional battery pack to deliver power to the portable radiotelephone.

We claim:

1. A portable foldable radiotelephone comprising:
    a first housing portion having first and second ends spaced by a first length;
    a transceiver positioned in said first housing portion;
    a second housing portion having first and second ends and first and second sides, said first and second ends of said second housing portion spaced by a second length substantially equal to the first length, said first and second sides of said second housing portion extending between said first and second ends of said second housing portion;
    a hinge positioned at said second end of said first housing portion and at said second end of said second housing portion;
    an inner wall positioned in said second housing portion to extend between said first and second sides of said second housing portion;
    a speaker enclosure formed in said second housing portion, said speaker enclosure bounded by said first end of said second housing portion, said inner wall, said first and second sides of said second housing portion, a first surface of said second housing portion and a second surface of said second housing portion;
    a speaker positioned in said speaker enclosure;
    a recess formed in said second housing portion, said recess bounded by said first surface of said second housing portion, said first and second sides of said second housing portion, said inner wall and said second end of said second housing portion, said recess for receipt of a battery pack;
    a mating latch member associated with said recess;
    a first plurality of battery contacts associated with said recess; and
    a battery pack adapted to be removably received in said recess, said battery pack having a latch member and a second plurality of battery contacts, said latch member to engage said mating latch member, and said second plurality of battery contacts to engage said first plurality of battery contacts.

2. A portable foldable radiotelephone according to claim 1 wherein
    said mating latch member is formed on said inner wall, and
    said latch member is carried on an end of said battery pack.

3. A portable foldable radiotelephone according to claim 2 wherein
    said first plurality of battery contacts are carried in respective openings of said inner wall, and
    said second plurality of battery contacts are carried on said end of said battery pack.

4. A portable foldable radiotelephone according to claim 3 wherein
    said mating latch member is located at a center of said inner wall equidistant from said first and second sides of said second housing portion,
    a first one of said first plurality of battery contacts is positioned between the center of said inner wall and said first side of said second housing portion, and
    a second one of said first plurality of battery contacts is positioned between the center of said inner wall and said second side of said second housing portion, said first and second ones of said first plurality of battery contacts equidistant from the center.

5. A portable foldable radiotelephone according to claim 1 wherein
said first plurality of battery contacts are carried in respective openings of said inner wall, and
said second plurality of battery contacts are carried on an end of said battery pack.

6. A portable foldable radiotelephone according to claim 5 wherein
a first one of said first plurality of battery contacts is positioned between a center of said inner wall and said first side of said second housing portion, and
a second one of said first plurality of battery contacts is positioned between the center of said inner wall and said second side of said second housing portion, said first and second ones of said first plurality of battery contacts equidistant from the center.

7. A portable foldable radiotelephone comprising:
a first housing portion having first and second ends spaced by a first length;
a transceiver positioned in said first housing portion;
a second housing portion having first and second ends and first and second sides, said first and second ends of said second housing portion spaced by a second length substantially equal to the first length, said first and second sides of said second housing portion extending between said first and second ends of said second housing portion;
a hinge positioned at said second end of said first housing portion and at said second end of said second housing portion;
an inner wall positioned in said second housing portion to extend between said first and second sides of said second housing portion;
a speaker positioned in said second housing portion between said first end of said second housing portion and said inner wall and between said first and second sides of said second housing portion;
a recess positioned in said second housing portion between said first and second sides of said second housing portion and between said inner wall and said second end of said second housing portion, said recess for receipt of a battery pack;
a mating latch member formed on said inner wall, said mating latch member comprising a recessed area;
a first plurality of battery contacts associated with said recess; and
a battery pack adapted to be removably received in said recess, said battery pack having a latch member and a second plurality of battery contacts, said latch member comprising a fixed portion, a lever arm, and a fulcrum joining said fixed portion to said lever arm, said fixed portion attached to an end of said battery pack, said lever arm movable under applied pressure in a direction towards said end of said battery pack, and said fulcrum biasing said lever arm in a direction away from said end of said battery pack, and, when said battery pack is removably received in said recess, said lever arm inserting into said recessed area to engage said latch member and mating latch member and said second plurality of battery contacts engaging said first plurality of battery contacts.

8. A portable foldable radiotelephone according to claim 7 wherein
said recessed area further comprises first and second shoulders, said first shoulder of said recessed area positioned to extend from one side of said recessed area, said second shoulder of said recessed area positioned to extend from another side of said recessed area opposite said one side of said recessed area, and
said lever arm further comprises first and second shoulders, said first shoulder of said lever arm formed in one side of said lever arm, said second shoulder of said lever arm formed in another side of said lever arm opposite said one side of said lever arm, said first shoulder of said lever arm to insert under said first shoulder of said recessed area when said battery pack is removably received in said recess, and said second shoulder of said lever arm to insert under said second shoulder of said recessed area when said battery pack is removably received in said recess.

9. A portable foldable radiotelephone according to claim 7 wherein
said first plurality of battery contacts are carried in respective openings of said inner wall, and
said second plurality of battery contacts are carried on said end of said battery pack.

10. A portable foldable radiotelephone according to claim 9 wherein
said mating latch member is located at a center of said inner wall equidistant from said first and second sides of said second housing portion,
a first one of said first plurality of battery contacts is positioned between the center of said inner wall and said first side of said second housing portion, and
a second one of said first plurality of battery contacts is positioned between the center of said inner wall and said second side of said second housing portion, said first and second ones of said first plurality of battery contacts equidistant from the center.

11. A portable foldable radiotelephone comprising:
a first housing portion having first and second ends spaced by a first length;
a transceiver positioned in said first housing portion;
a second housing portion having first and second ends, first and second sides, and first and second surfaces, said first and second ends of said second housing portion spaced by a second length substantially equal to the first length, said first and second sides of said second housing portion extending between said first and second ends of said second housing portion, said first surface of said second housing portion extending from said first end of said second housing portion and between said first and second sides of said second housing portion, and said second surface extending between said first and second ends of said second housing portion and between said first and second sides of said second housing portion;
a hinge positioned at said second end of said first housing portion and at said second end of said second housing portion;
an inner wall extending between said first and second sides of said second housing portion and between said first and second surfaces of said second housing portion;
a speaker enclosure formed in said second housing portion, said speaker enclosure bounded by said first end of said second housing portion, said inner wall, said first and second sides of said second housing portion, said first surface of said second housing portion and said second surface of said second housing portion;

a speaker positioned in said speaker enclosure;

a recess formed in said second housing portion, said recess bounded by said first surface of said second housing portion, said first and second sides of said second housing portion, said inner wall and said second end of said second housing portion, said recess for receipt of a battery pack;

a mating latch member formed on said inner wall to face said recess, said mating latch member comprising a recessed area having first and second shoulders extending therefrom;

a first plurality of battery contacts carried in respective openings of said inner wall and facing said recess, a first one of said first plurality of battery contacts positioned between said recessed area of said mating latch member and said first side of said second housing portion, a second one of said first plurality of battery contacts positioned between said recessed area of said mating latch member and said second side of said second housing portion; and a battery pack adapted to be removably received in said recess, said battery pack comprising first and second ends, first and second surfaces, first and second sides extending between said first and second ends of said battery pack and spaced apart by said first and second surfaces of said battery pack, a second plurality of battery contacts carried on said first end of said battery pack, and a latch member carried on said first end of said battery pack, said latch member comprising a movable lever arm having first and second shoulders formed in sides thereof, and wherein, upon reception of said battery pack in said recess, said first end of said battery pack juxtaposes said inner wall, said first and second shoulders of said lever arm insert under respective ones of said first and second shoulders of said recessed area to thereby mate said latch member and mating latch member, said first plurality of battery contacts mate with said second plurality of battery contacts, said first surface of said battery pack joins flush said first surface of said second housing portion to form a continuous surface, at least a portion of said first side of said battery pack joins flush said first side of said second housing portion to form a continuous surface, and at least a portion of said second side of said battery pack joins flush said second side of said second housing portion to form a continuous surface.

* * * * *

UNITED STATES PATENT AND TRADEMARK OFFICE
CERTIFICATE OF CORRECTION

PATENT NO. : 5,857,148
DATED : January 5, 1999
INVENTOR(S) : Weisshappel et al.

It is certified that error appears in the above-indentified patent and that said Letters Patent is hereby corrected as shown below:

Title Page

Item [60] Related U.S. Application Data insert the priority information as follows:
--Continuation-in-part of Ser. No. 08/489,872, June 13, 1995.--

Signed and Sealed this

Tenth Day of August, 1999

Attest:

Q. TODD DICKINSON

Attesting Officer      Acting Commissioner of Patents and Trademarks